US012756583B2

(12) United States Patent
Bai

(10) Patent No.: US 12,756,583 B2
(45) Date of Patent: Oct. 6, 2026

(54) BLOCKCHAIN-BASED USER INFORMATION PROCESSING METHOD AND SYSTEM

(71) Applicants: JINGDONG TECHNOLOGY INFORMATION TECHNOLOGY CO., LTD., Beijing (CN); JINGDONG TECHNOLOGY HOLDING CO., LTD., Beijing (CN)

(72) Inventor: Yu Bai, Beijing (CN)

(73) Assignees: JINGDONG TECHNOLOGY INFORMATION TECHNOLOGY CO., LTD., Beijing (CN); JINGDONG TECHNOLOGY HOLDINGS CO., LTD., Beijing (CN)

( * ) Notice: Subject to any disclaimer, the term of this patent is extended or adjusted under 35 U.S.C. 154(b) by 905 days.

(21) Appl. No.: 18/003,856

(22) PCT Filed: Jun. 21, 2021

(86) PCT No.: PCT/CN2021/101192
§ 371 (c)(1),
(2) Date: Dec. 29, 2022

(87) PCT Pub. No.: WO2022/001717
PCT Pub. Date: Jan. 6, 2022

(65) Prior Publication Data

US 2023/0269103 A1 Aug. 24, 2023

(30) Foreign Application Priority Data

Jun. 30, 2020 (CN) ......................... 202010619447.2

(51) Int. Cl.
*H04L 9/00* (2022.01)
*H04L 9/32* (2006.01)
*H04L 29/06* (2006.01)

(52) U.S. Cl.
CPC .............. *H04L 9/50* (2022.05); *H04L 9/3228* (2013.01)

(58) Field of Classification Search
CPC ......... H04L 9/50; H04L 9/3228; H04L 9/321; H04L 9/32; H04L 9/3236; G06F 21/30; G06F 21/31; G06F 21/604
See application file for complete search history.

(56) References Cited

U.S. PATENT DOCUMENTS

2019/0245693 A1 8/2019 Iyer et al.
2019/0333054 A1* 10/2019 Cona ..................... H04W 12/06
(Continued)

FOREIGN PATENT DOCUMENTS

CN 104038552 A 9/2014
CN 108900562 A 11/2018
(Continued)

OTHER PUBLICATIONS

First Office Action issued in counterpart Chinese Patent Application No. 202010619447.2, dated Nov. 27, 2023.
(Continued)

*Primary Examiner* — Edward Zee
(74) *Attorney, Agent, or Firm* — Westbridge IP LLC

(57) ABSTRACT

Disclosed are a blockchain-based user information processing method and a system. The method is applied to any application node in a blockchain, the blockchain includes a plurality of application nodes, the method includes: receiving a user information change request sent by a user terminal, the user information change request carries first identity information of the user and new user information to be changed; verifying the first identity information and the new user information through a plurality of verification application nodes in the blockchain respectively, the verification application nodes are application nodes in the blockchain;
(Continued)

and changing user information of the user stored in the blockchain based on the new user information if the first identity information and the new user information pass verification.

15 Claims, 3 Drawing Sheets

(56) References Cited

U.S. PATENT DOCUMENTS

| | | | | |
|---|---|---|---|---|
| 2020/0177597 | A1 | 6/2020 | Kabesa et al. | |
| 2020/0186509 | A1 * | 6/2020 | Kursun | H04L 63/1466 |

FOREIGN PATENT DOCUMENTS

| | | | |
|---|---|---|---|
| CN | 109088866 | A | 12/2018 |
| CN | 109241192 | A | 1/2019 |
| CN | 109344631 | A | 2/2019 |
| CN | 109359976 | A | 2/2019 |
| CN | 111209061 | A | 5/2020 |
| CN | 111783049 | A | 10/2020 |
| JP | 2010285771 | A | 12/2010 |
| JP | 2012226594 | A | 11/2012 |
| JP | 2017207979 | A | 11/2017 |
| JP | 2019020823 | A | 2/2019 |
| JP | 2019029933 | A | 2/2019 |
| JP | 2020010299 | A | 1/2020 |
| TW | 201906389 | A | 2/2019 |

OTHER PUBLICATIONS

Notice of Reasons for Refusal issued in counterpart Japanese Patent Application No. JP 2022-581689, dated Mar. 19, 2024.
Second Office Action issued in counterpart Chinese Patent Application No. 202010619447.2, dated May 6, 2024.
Extended European Search Report issued in counterpart European Patent Application No. 21833282.3, dated Jun. 4, 2024.
Second Office Action issued in counterpart Japanese Patent Application No. 2022-581689, dated Jul. 2, 2024.
International Search Report and Written Opinion issued in corresponding PCT Application No. PCT/CN2021/101192, dated Sep. 6, 2021.

* cited by examiner

BLOCKCHAIN-BASED USER INFORMATION PROCESSING METHOD AND SYSTEM

CROSS-REFERENCE TO RELATED APPLICATIONS

This application is the National Stage of International Application No. PCT/CN2021/101192, filed on Jun. 21, 2021, which claims priority to Chinese Patent Application No. 202010619447.2, entitled "BLOCKCHAIN-BASED USER INFORMATION PROCESSING METHOD AND SYSTEM" and filed with China National Intellectual Property Administration on Jun. 30, 2020, all contents of which are incorporated herein by reference.

TECHNICAL FIELD

The present disclosure generally relates to the technical field of blockchain, and more particularly to a blockchain-based user information processing method and a system.

BACKGROUND

With the development of the internet, a user can log in to a plurality of applications with the same user information. The user information can be an account name, an account password and a mobile phone number. However, when the user wants to change the user information, the user needs to change the original user information into new user information in each registered application. The operation is complicated and results in inconvenience in changing the user information.

SUMMARY

In a first aspect, the present disclosure provides a blockchain-based user information processing method, the method is applied to any application node in a blockchain, the blockchain includes a plurality of application nodes, the method including:

- receiving a user information change request sent by a user terminal, wherein the user information change request carries first identity information of the user and new user information to be changed;
- verifying the first identity information and the new user information through a plurality of verification application nodes in the blockchain respectively, the verification application nodes are application nodes in the blockchain; and
- changing user information of the user stored in the blockchain based on the new user information if the first identity information and the new user information pass verification.

In some embodiments, verifying the first identity information and the new user information through a plurality of verification application nodes in the blockchain respectively includes:

- sending the first identity information and the new user information to each verification application node in the blockchain;
- acquiring second identity information of the user stored in the blockchain through each of the verification application nodes; and
- verifying the new user information through the verification application node if the first identity information and the second identity information are the same.

In some embodiments, the new user information includes a mobile phone number, verifying the new user information through the verification application node includes:

- sending verification information to the user terminal corresponding to the mobile phone number through the verification application node and receiving feedback information sent by the user terminal, the feedback information is input by the user based on the verification information;
- determining that the new user information passes verification if the feedback information matches the verification information;
- determining that the new user information fails to pass verification if the feedback information does not match the verification information.

In some embodiments, the user information change request also carries original user information of the user, the method further includes:

- acquiring the user information of the user stored in the blockchain through a plurality of verification application nodes respectively;
- determining that the original user information passes verification if the original user information is the same as the user information; and
- changing the user information of the user stored in the blockchain based on the new user information if the first identity information and the new user information pass verification includes:
- changing the user information based on the new user information if the first identity information, the new user information and the original user information all pass verification.

In some embodiments, the first identity information and the new user information pass verification in a manner including:

- acquiring a verification result generated by each of the verification application nodes verifying the first identity information and the new user information to obtain a plurality of verification results; and
- determining that the first identity information and the new user information pass verification if the plurality of verification results satisfy a preset consistency condition.

In some embodiments, the method further includes:

- receiving a user registration request sent by the user terminal, the user registration request carries third identity information and user information of the user;
- sending the third identity information to an identity information verification node in the blockchain so that the identity information verification node verifies the third identity information; and
- storing the third identity information and the user information into the blockchain if the identity information verification node verifies that the third identity information passeses verification.

In a second aspect, the present disclosure provides a blockchain-based user information processing system, wherein the system includes a plurality of application nodes, wherein,

- a responsive application node among the plurality of application nodes, configured for receiving a user information change request sent by a user terminal, sending first identity information and new user information to be changed to a plurality of verification application nodes in the plurality of application nodes, the first identity information and the new user information are carried by the user information change request;

each verification application node, configured for verifying the first identity information and the new user information; and the responsive application node, further configured for changing the user information of the user stored in the blockchain based on the new user information when the first identity information and the new user information pass verification.

In some embodiments, the verification application node is configured for sending verification information to a user terminal corresponding to a mobile phone number when the new user information includes the mobile phone number, and receiving feedback information sent by the user terminal, the feedback information is input by the user based on the verification information; and determining that the new user information passes verification when the feedback information matches the verification information; determining that the new user information fails to pass verification when the feedback information does not match the verification information.

In some embodiments, the verification application node is configured for sending to the responsive application node a verification result generated by verifying the first identity information and the new user information; and the responsive application node is configured for receiving a verification result generated by each verification application node to obtain a plurality of verification results; and determining that the first identity information and the new user information pass verification when the plurality of verification results meet a preset consistency condition.

In some embodiments, the responsive application node is further configured for receiving a user registration request sent by the user terminal, the user registration request carries a third identity information and the user information of the user, and is used for sending the third identity information to an identity information verification node in the blockchain;

the identity information verification node is configured for verifying the third identity information and sending a verification result to the responsive application node, the verification result is verification passed or verification failed;

the responsive application node is further configured for storing the third identity information and the user information into the blockchain when the verification result received is verification passed.

In some embodiments, the user terminal is configured for generating a user public key and a user private key, and encrypting the user information and the third identity information by using the user private key, and sending the encrypted user information and the third identity information to the responsive application node; and the responsive application node is configured for storing the encrypted user information and the third identity information into the blockchain.

In a third aspect, the present disclosure provides a blockchain-based user information processing apparatus, wherein the apparatus is applied to any application node, the blockchain includes a plurality of application nodes, the apparatus including:

a first receiving module, configured for receiving a user information change request sent by a user terminal, wherein the user information change request carries first identity information of the user and new user information to be changed;

a verification module, configured for verifying the first identity information and the new user information through a plurality of verification application nodes in the blockchain respectively, the verification application nodes are application nodes in the blockchain; and a changing module, configured for changing user information of the user stored in the blockchain based on the new user information when the first identity information and the new user information pass verification.

In some embodiments, the verification module includes:

a sending sub-module, configured for sending the first identity information and the new user information to each verification application node in the blockchain;

an acquisition sub-module, configured for acquiring second identity information of the user stored in the blockchain through each of the verification application nodes; and a first verification sub-module, configured for verifying the new user information through the verification application node when the first identity information and the second identity information are the same.

In some embodiments, the first verification sub-module is configured for, under the condition that the new user information includes the mobile phone number, sending verification information to the user terminal corresponding to the mobile phone number through the verification application node and receiving feedback information sent by the user terminal, wherein the feedback information is input by the user based on the verification information; it is determined that the new user information passes verification if the feedback information matches the verification information; it is determined that the new user information fails to pass verification if the feedback information does not match the verification information.

In some embodiments, the apparatus further includes:

an acquisition module, configured for acquiring the user information of the user stored in the blockchain through a plurality of verification application nodes respectively under the condition that the user information change request also carries original user information of the user;

the verification module is further configured for determining that the original user information passes verification when the original user information is the same as the user information; and the changing module is configured for changing the user information based on the new user information when the first identity information, the new user information and the original user information all pass verification.

In some embodiments, the verification module includes:

a second acquisition sub-module, configured for acquiring a verification result generated by each of the verification application nodes verifying the first identity information and the new user information to obtain a plurality of verification results; and a determination sub-module, configured for determining that the first identity information and the new user information pass verification when the plurality of verification results satisfy a preset consistency condition.

In some embodiments, the apparatus further includes:

a second receiving module, configured for receiving a user registration request sent by the user terminal, wherein the user registration request carries third identity information and user information of the user;

a sending module, configured for sending the third identity information to an identity information verification node in the blockchain so that the identity information verification node verifies the third identity information; and a storage module, configured for storing the third identity information and the user information into the blockchain when the third identity information passes verification by the identity information verification node.

In a fourth aspect, the present disclosure provides an electronic device, including: a processor, a communication interface, a memory and a communication bus, wherein the processor, the communication interface and the memory communicate with each other through the communication bus;

the memory is configured for storing computer programs;

the processor is configured to implement the blockchain-based user information processing method according to the present disclosure when executing a program stored in the memory.

In a fifth aspect, the present disclosure provides a computer-readable storage medium, a program is stored on the computer-readable storage medium, the program, when executed by the processor, implements the blockchain-based user information processing method according to the present disclosure.

In a sixth aspect, the present disclosure provides a computer program product including instructions that, when run on a computer, cause the computer to execute the blockchain-based user information processing method according to the present disclosure.

In some embodiments, the blockchain-based user information processing method provided by the present disclosure solved the problem that it is inconvenient to change the user information.

In some embodiments, the blockchain-based user information processing method provided by the present disclosure can receive a user information change request sent by the user terminal, wherein the user information change request carries the first identity information of the user and the new user information to be changed; verify the first identity information and the new user information through a plurality of verification application nodes in the blockchain respectively; change the user information of the user stored in the blockchain based on the new user information if the first identity information and the new user information pass verification.

Because it can be realized that changing a user's information in each application by changing the new user information in the blockchain only once. Therefore, it does not need to change a user's information in each application respectively, thereby solving the problem of inconvenience in changing the user information.

Of course, the implementation of any product or method of the present disclosure does not necessarily need to achieve all the advantages described above at the same time.

BRIEF DESCRIPTION OF THE DRAWINGS

In order to explain the technical proposal of the present disclosure more clearly, the drawings required for use in the present disclosure will be briefly introduced below, and it will be obvious that other drawings can be obtained from these drawings without creative labor for those of ordinary skill in the art.

DETAILED DESCRIPTION OF THE EMBODIMENTS

A clear and complete description of the technical aspects of the embodiments of the present disclosure will be given below in conjunction with the accompanying drawings in the embodiments of the present disclosure, and it will be apparent that the described embodiments are only part of the embodiments of the present disclosure, not all of them. Based on the embodiments in the present disclosure, all other embodiments obtained by those skilled in the art without making creative effort fall within the scope of protection of the present disclosure.

Figure 1:
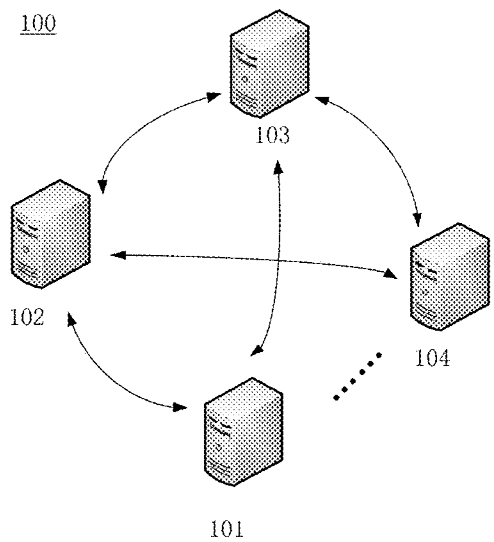
FIG. 1 illustrates a schematic structural diagram of a blockchain-based user information processing system provided by an embodiment of the present disclosure.

Embodiments of the present disclosure provide a blockchain-based user information processing system. FIG. 1 illustrates a schematic structural diagram of a blockchain-based user information processing system provided by an embodiment of the present disclosure. A blockchain 100 may include a plurality of application nodes (101, 102, 103, 104 . . . ). Each application node (101, 102, 103, 104 . . . ) is equivalent, and the numbers 101, 102, 103, 104 are only used as marks, not to limit the order of each node.

Each application node (101, 102, 103, 104 . . . ) in the blockchain may be a server for each application. In some embodiments, an application node 101 may be a server for an application called "take out", an application node 102 may be a server for an application "shopping" and an application node 103 may be a server for an application "schedule".

After a user registers an application, the user information of the user can be stored in the blockchain. The user information can be a mobile phone number, an account name used to log in to the application, an account password and a contact address, etc. Thus, user information of a user using each application can be stored in the blockchain. Subsequently, the user can log in to each application through a user terminal and the same user information. The user terminal can be a device such as a mobile phone, a tablet computer, a smart wearable devices used by the user.

Figure 2:
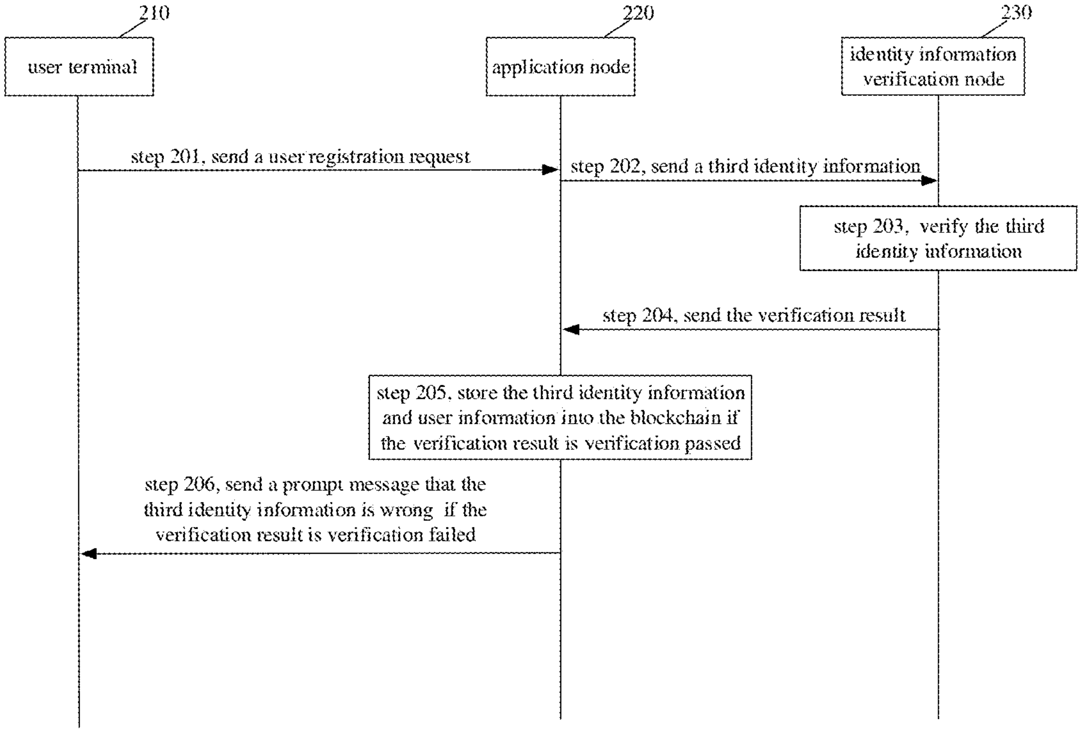
FIG. 2 illustrates a flowchart of a blockchain-based user information processing method provided by an embodiment of the present disclosure.

The process of a user registering an application will be described below in connection with specific embodiments. As shown in FIG. 2, the process of registering an application by a user may include:

step 201, an user terminal 210 sends a user registration request to an application node 220;

step 202, the application node 220 sends third identity information to an identity information verification node 230 in the blockchain;

step 203, the identity information verification node 230 verifies the third identity information;

step 204, the identity information verification node 230 sends the verification result to the application node 220;

step 205, if the verification result is verification passed, then the application node 220 may store the third identity information and user information into the blockchain; and step 206, if the verification result is verification failed, the application node 220 may send to the user terminal 210 a prompt message that the third identity information is wrong.

In some embodiments, a user registration request carries third identity information and user information of the user.

In some embodiments, when a user wants to register an application, the user may perform a preset registration operation to the user terminal 210. The preset registration operation can be clicking on a preset submission icon after filling in the third identity information and user information of the user on the preset registration page of the application. The preset registration operation may also be entering a command code indicating submission after filling in the third identity information and user information of the user on the preset registration page of the application.

In response to the preset registration operation, the user terminal 210 may generate a user registration request and then send the user registration request to the application node 220 corresponding to the application.

In some embodiments, the identity information may be a user's name, an identity card number, an image containing the user's face features, and the like. In order to distinguish easily, the identity information used when the user changes the user information is called first identity information, the identity information of the user stored in the blockchain is called a second identity information, and the identity information sent when the user registers an application is called a third identity information. The first identity information, the second identity information and the third identity information may be the same identity information or may be different identity information.

In some embodiments, the blockchain may also include an identity information verification node 230. The identity information verification node may store identity information of each user. The identity information verification node 230 may be a server of a system for inquiring identity information of national residents.

The application node 220 may send, upon receiving the user registration request, the third identity information to the identity information verification node 230 in the blockchain.

In some embodiments, if the third identity information includes an image containing a user's face features, the identity information verification node 230 can compare the face features contained in the third identity information with each face feature stored in the blockchain through a face comparison algorithm pre-configured in the blockchain, thereby judging whether the third identity information passes verification.

If the third identity information includes a name, the process of verifying the name by the identity information verification node 230 is similar to the process of verifying the name by any electronic device in the related art and will not be repeated here.

Similarly, if the third identity information includes an identity card number, the process of verifying the identity card number by the identity information verification node 230 is similar to the process of verifying the identity card number by any electronic device in the related art and will not be repeated here.

In some embodiments, the identity information verification node 230 sends a verification result to the application node 220 where the verification result is either verification passed or verification failed.

In some embodiments, after the third the identity information passes verification by the identity information verification node 230, the application node 220 can also initiate verification of the user information, and the application node 220 can store the third identity information and the user information in the blockchain after the user information passes verification.

The specific process of verifying the user information by the application node 220 will be described in detail later.

In some embodiments, the application node may receive the third identity information and the user information of the user sent by the user terminal, and then send the third identity information to the identity information verification node in the blockchain, so that the identity information verification node verifies the third identity information. If the identity information verification node verifies the third identity information, the application node may store the third identity information and the user information in the blockchain.

Therefore, on one hand, by packaging and storing the third identity information and user information of the user into the blockchain, it can be realized that after registering a certain application contained in the blockchain, the user can log in to other applications contained in the blockchain with the same user information, which is convenient for the user to register and use each application quickly. On the other hand, it is convenient to change user information based on blockchain subsequently.

In some embodiments, since it involves that saving the user's private information such as the identity information and the user information of the user in the blockchain, the user terminal can generate a user public key and a user private key in order to further improve the information security In the registration process, the user terminal may generate the user public key and the user private key at various times. In some embodiments, the user terminal may generate a user public key and a user private key after receiving the user information and the third identity information of the user. Alternatively, the user terminal can generate the user public key and the user private key after the third identity information passes veritificaiton.

The ways in which the user terminal generates the user public key and the user private key can also be various. In some embodiments, the user terminal can randomly generate a pair of public key and private key as the user public key and the user private key according to a key generation algorithm, wherein, the key generation algorithm can be Message-Digest algorithm 5 algorithm (MD5), Rivest-Shamir-Adleman algorithm algorithm (RSA). Alternatively, the user terminal may generate a pair of public key and private key as the user public key and the user private key of the user according to the key generation algorithm and the user information.

In the process of using the application, private information such as identity information and user information can be written in blockchain based on the user private key and the user public key.

In some embodiments, the application node may sign the third identity information and the user information using the user private key, and then the application node may write the signature into the blockchain.

Subsequently, when changing the user information, the user terminal can encrypt the new user information by using the user private key, and send the encrypted new user information and the user public key to the application node. The application node can decrypt the user information stored in the blockchain by using the received user public key and decrypt the encrypted new user information by using the user public key.

After the user completes the registration of the application, the user can log in to the application through the user terminal and the user information. In the process of using the application, if a user wants to change a certain user information, the user only needs to fill in the new user information once, and the change can be realized through the blockchain user information of the user in each application. Therefore, the user does not need to change the user information in each application separately, such that the problem of inconvenience in change of the user information can be solved.

Figure 3:
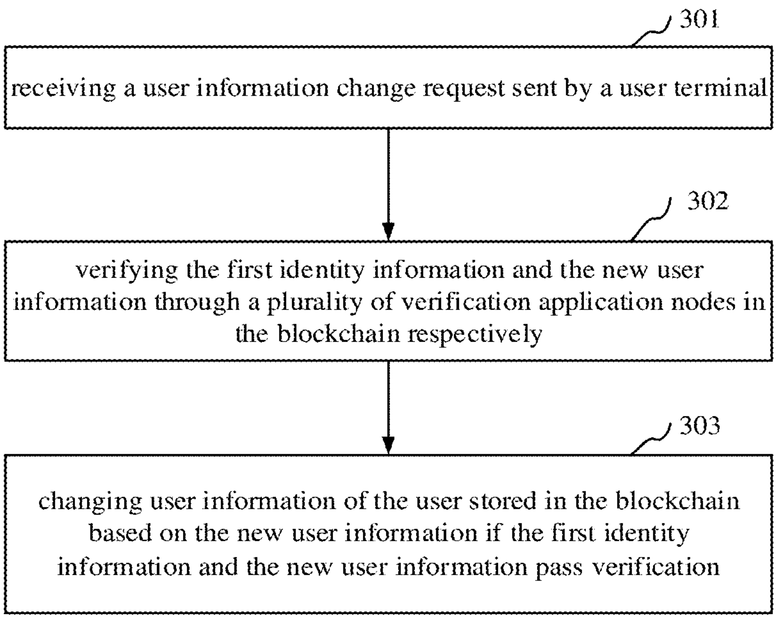
FIG. 3 illustrates another flowchart of a blockchain-based user information processing method provided by an embodiment of the present disclosure.

The embodiment of the present disclosure also explains the process of the blockchain-based user information changing. As shown in FIG. 3, the processing process includes:

step 301, receiving a user information change request sent by a user terminal;

step 302, verifying first identity information and new user information through a plurality of verification application nodes respectively; and step 303, changing the user information of the user stored in the blockchain based on the new user information if the first identity information and the new user information pass verification.

In some embodiments, the user information change request carries first identity information of a user, new user information to be changed.

In some embodiments, if a user wants to change certain user information, the user may perform a user information change operation on the user terminal during use of any application. The user information change operation may be clicking on a preset user information change icon. The user information change operation may also be a user information change operation sending out a voice command to change the user information. After a user information change operation is detected, the user terminal can obtain the first identity information of the user and the new user information to be changed. Then, the user terminal can generate a user information change request carrying the first identity information and the new user information, and thereafter, the user terminal can send the user information change request to an application node corresponding to the application.

In some embodiments, if the user wants to change the mobile phone number, the user may perform a user information change operation on the user terminal during the process of using the application "shopping", and then the user terminal may display an information entry page so that the user enters identity information "Xiaoming", "101010202002334567" and a new mobile phone number "55612346789" in the page. After that, the user terminal can generate a user information change request carrying the first identity information "Xiaoming", "101010202002334567" and the new user information "55612346789", and send the user information change request to the application node corresponding to the application "shopping".

In some embodiments, a user may perform a user information change operation while using any application. For ease of distinction, the application node corresponding to the application currently being used by the user is referred to as the responsive application node.

In some embodiments, after receiving the user information change request, a responsive application node may determine a plurality of verification application nodes among the plurality of application nodes included in the blockchain. Then, the responsive application node can verify the first identity information and the new user information through each verification application node respectively.

The verification application node can verify the first identity information and the new user information in a variety of ways. In a feasible implementation, the verification application node can first verify the first identity information and then verify the new user information. In another feasible implementation, the verification application node can verify the new user information first and then verify the first identity information. The detailed process of verification application node verifing the new user information and the first identity information will be described later.

In some embodiments the verification application node may be any application node among a plurality of application nodes other than the responsive application node. The responsive application node can treat all application nodes other than the responsive application node as verification application nodes. The responsive application node can also use a preset quantity of other application nodes as verification application nodes. The quantity of verification application nodes can be preset by a technician.

In some embodiments, in the situation that both the first identity information and the new user information pass verification, each verification application node may send to the responsive application node a verification result indicating verification passed. If the first identity information or the new user information fails to pass verification, the verification application node may send a verification result indicating the failure of verification to the responsive application node.

The responsive application node can determine whether the first identity information and the new user information pass verification based on a plurality of received verification results after receiving the verification results sent by each verification application node.

If the responsive application node determines that both the first identity information and the new user information pass verification based on the received verification result, the responsive application node may change the user information of the user stored in the blockchain based on the new user information. If the first identity information or the new user information fails to pass verification, the responsive application node may send prompt information of failure of verification to the user terminal.

In some embodiments, the application node can receive a user information change request sent by the user terminal, wherein the user information change request carries the first identity information of the user and the new user information to be changed; verify the first identity information and the new user information through a plurality of verification application nodes in the blockchain respectively; change the user information of the user stored in the blockchain based on the new user information if the first identity information and the new user information pass verification.

Because it can be realized that changing a user's information in each application by changing the new user information in the blockchain only once. Therefore, it does not need to change a user's information in each application respectively, thereby solving the problem of inconvenience in changing the user information.

Figure 4:
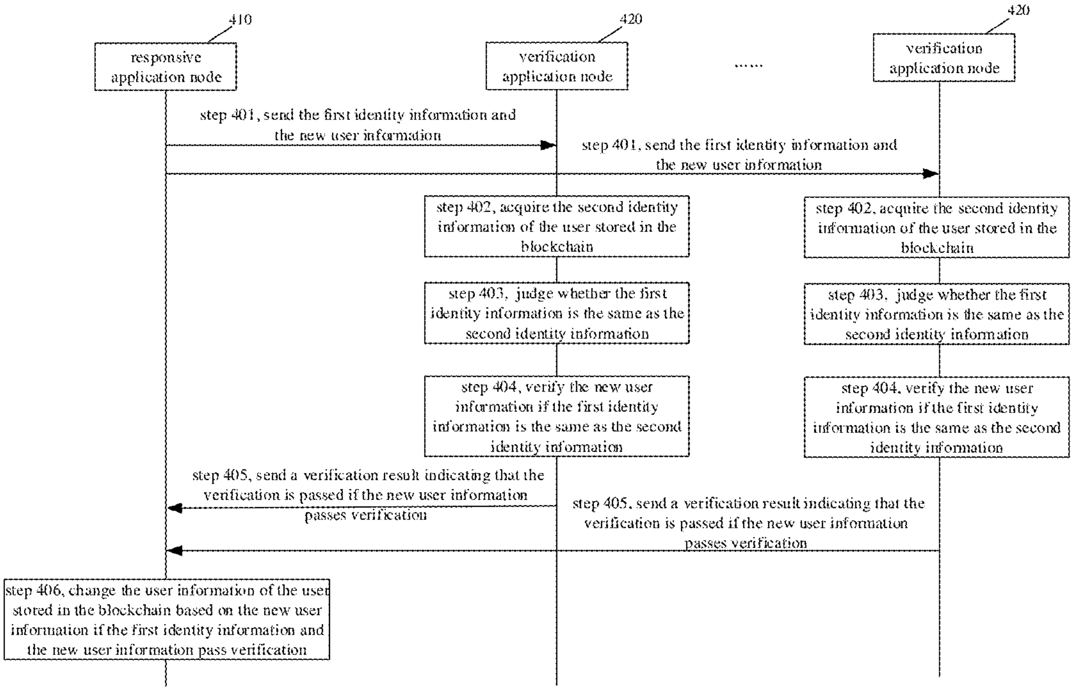
FIG. 4 illustrates another flowchart of a blockchain-based user information processing method provided by an embodiment of the present disclosure.

In some embodiments, the present disclosure takes verifying the first identity information first and then verifying the new user information as an example, and explains the verification process of verifying the application node, as shown in FIG. 4, including the following steps:

step 401, a responsive application node 410 sends the first identity information and the new user information to each verification application node 420 in the blockchain;

step 402, each verification application node 420 acquires the second identity information of the user stored in the blockchain;

step 403, the verification application node 420 judges whether the first identity information is the same as the second identity information;

step 404, if the first identity information is the same as the second identity information, the verification application node 420 verifies the new user information;

step 405, if the new user information passes verification, the verification application node 420 sends a verification result indicating that the verification is passed to the responsive application node 410; and step 406, if the first identity information and the new user information pass verification, the responsive application node 410 changes the user information of the user stored in the blockchain based on the new user information.

In some embodiments, upon receiving the user information change request sent by the user terminal, the responsive application node 410 may send the first identity information and the new user information to each verification application node 420 in the blockchain.

In some embodiments, each verification application node 420 may determine the identity information of a user to be changed for user information among a plurality of identity information stored in the blockchain to obtain a second identity information.

In some embodiments, the responsive application node 410 may also send to each verification application node 420 a user identity of the user to which the user information is to be changed. Thus, the verification application node 420 may determine a second identity information among a plurality of identity information stored in the blockchain according to the user identity.

In some embodiments, the step that the verification application node 420 determines whether the first identity information is the same as the second identity information may refer to the process of verifying the third identity information of the user by the identity information verification node in the above-mentioned user registration process, and will not be repeated here.

If the first identity information is the same as the second identity information, the verification application node 420 can perform step 404. If the first identity information is different from the second identity information the verification application node 420 may send a verification result that the verification failed.

In some embodiments, the verification application node 420 verifies the new user information if the first identity information is the same as the second identity information, wherein the new user information may include at least one item of information such as a mobile phone number, an account name, an account password, and a contact address used to log in to the application.

As for various types of information contained in the new user information, the verification process of the new user information by the verification application node 420 varies, the detailed verification process will be described later.

In some embodiments when the new user information fails to pass verification, the verification application node 420 sends a verification result indicating the failure of verification to the responsive application node 410.

In some embodiments the responsive application node 410 may send first identity information and new user information to each verification application node 420 in the blockchain. Then, each verification application node 420 can obtain a second identity information of the user stored in the blockchain, and then judge whether the first identity information is the same as the second identity information. Thereafter each verification application node 420 may verify the new user information if the first identity information and the second identity information are the same. Because the new user information is verified after the first identity information is verified, on the one hand, it can ensure that the change of user information is initiated by the user with a change authority; on the other hand, it can avoid a situation that the change of user information is invalid after the verification of new user information is passed, thus reducing the data processing burden of the whole blockchain.

In some embodiments, in order to further improve the security of the user information change, the user information change request may also carry original user information, and the responsive application node 410 may send the original user information to each verification application node 420. Each verification application node 420 may obtain user information of the user stored in the blockchain, and then each verification application node 420 may compare the original user information with the obtained user information.

Thereafter, the verification application node 420 may send a verification result indicating that the verification has been passed to the responsive application node 410 in the situation that the first identity information, the new user information, and the original user information have all pass verification.

Embodiments of the present disclosure do not specifically limit the order in which the verification application node verifies the first identity information, the new user information, and the original user information.

In some embodiments, for two situations of whether the new user information contains a mobile phone number, the embodiment of the present disclosure provides implementations for verifying the new user information by a verifying application node under corresponding situations, including:

Case 1: The New User Information Contains a Mobile Phone Number.

In this case, the verification application node can send verification information to the user terminal corresponding to the mobile phone number and receive feedback information sent by the user terminal. The feedback information is input by the user based on the verification information. The verification information may be a short message containing verification characters, and correspondingly, the feedback information may be verification characters. Alternatively, the verification information may be a short message containing a preset question, and correspondingly, the feedback information may be an answer to the preset question. A default question can be set and answered by the user while using the application.

The verification application node can judge whether the feedback information matches the verification information, and if the feedback information matches the verification information, the verification application node can judge that the new user information passes the verification; if the feedback information does not match the verification information, the verification application node can judge that the new user information fails to pass verification.

In some embodiments, the verification application node may generate verification information, and then the verification application node may send the verification information to the user terminal corresponding to the mobile phone number. The user terminal may output the received verification information so that the user inputs feedback information based on the verification information. After that, the user terminal can send feedback information to the verification application node.

In the situation that the verification message is a short message containing verification characters, the verification application node can judge whether the feedback message is the same as the verification character contained in the verification message. If the feedback information and the verification information contain the same verification character, the verification application node can determine that the new user information passes verification. If the feedback information and the verification information contain different verification characters, the verification application node can determine that the new user information fails to pass verification.

In some embodiments, the verification application node may generate a verification character "123456" according to a consensus algorithm, and send the verification character "123456" to the user terminal corresponding to the mobile phone number a short message containing verification character. After receiving the short message, the user can fill in the verification character on the preset page in the application, and then the responsive application node can send verification character to the verification application node. The verification application node can compare the received verification characters with the generated validation character. If the two validation character are the same, the verification application node can determine that the new user information passes verification. If the two validation characters are different, the verification application node can determine that the new user information fails to pass verification.

In a case where the verification information is a short message containing a preset question, the verification application node can judge whether the feedback information is the same as the answer to the preset question stored in advance. If the feedback information is the same as the answer, the verification application node can determine that the new user information passes verification. If the feedback information differs from the answer, the verification application node can determine that the new user information fails to pass verification.

Case 2, the New User Information does not Contain a Mobile Phone Number.

In this case, the verification application node may send prompt information to the responsive application node, and then the responsive application node can send the prompt information to the user terminal. The user terminal can display prompt information in a preset page of the application so that the user can input feedback information after seeing the prompt information. Then, the responsive application node may receive the feedback information sent by the user terminal and send the feedback information to the verification application node. After that, the verification application node can judge whether the feedback information matches the prompt information, and if the feedback information matches the prompt information, the verification application node can determine that the new user information passes verification. If the feedback information does not match the prompt information, the verification application node can determine that the new user information fails to pass verification.

In some embodiments, the prompt information is to prompt the user to re-enter new user information, and the feedback information can be re-entered user information. Verification application nodes can compare the re-entered user information with the new user information previously entered by the user. If the information of the two users is the same, then the verification application nodes can determine that the new user information passes verification. If the two information of the user is different, the verification application node can determine that the new user information fails to pass verification.

In some embodiments, a specific processing process of the application node 220 verifying the user information is similar to the processing process of the verification application node verifying the new user information, which will not be repeated here. The responsive application node can implement the above steps of verifying new user information by the verification the application node.

In some embodiments, after receiving the verification results sent by each verification application node, the responsive application node can judge whether the received plurality of verification results meet the preset consistency condition, and if the plurality of verification results meet the preset consistency condition, the responsive application node can determine that the first identity information and the new user information passes verification, if the plurality of verification results do not satisfy a preset consistency condition, the responsive application node can determine that the first identity information and the new user information fails to pass verification.

The preset consistency condition may be that a plurality of verification results pass verification. The preset consistency condition may also be that the number of results which pass verification in the plurality of verification results is greater than half of the total number of verification results.

In some embodiments, after the first identity information and the new user information pass verification, the responsive application node may change the user information of the user stored in the blockchain in a variety of ways. In a feasible implementation, the responsive application node can change the user information of the user stored in the blockchain to the new user information. In another feasible implementation, the application node can store the new user information and the first identity information in the blockchain.

In some embodiments, because it can be realized that changing a user's information in each application by changing the new user information in the blockchain only once. Therefore, it does not need to change a user's information in each application respectively, thereby solving the problem of inconvenience in changing the user information.

As for the situation that a certain user logs in to each application using the same user information, the user information processing method provided by an embodiment of the present disclosure can change the user information quickly, conveniently, safely and effectively.

A blockchain-based user information processing system is described below, as shown in FIG. 1 includes a plurality of application nodes (101, 102, 103, 104 . . . ). Each application node (101, 102, 103, 104 . . . ) may be a server for each application. In some embodiments, an application node 101 may be a server for an application called "take out", an application node 102 may be a server for an application "shopping" and an application node 103 may be a server for an application "schedule".

A responsive application node among the plurality of application nodes is configured for receiving a user information change request sent by a user terminal, and sending first identity information and new user information to be changed to a plurality of verification application nodes in the plurality of application nodes, wherein the first identity information and the new user information are carried by the user information change request;

Each verification application node is configured for verifying the first identity information and the new user information; and The responsive application node is further configured for changing the user information of the user stored in the blockchain based on the new user information when the first identity information and the new user information pass verification.

In some embodiments, when a user wants to change certain user information, the user can perform a user information change operation on the user terminal in the process of using any application. The user information change operation may be clicking on a preset user information change icon. The user information change operation may also be a user information change operation sending out a voice command to change the user information. The user information can be a mobile phone number, an account name used to log in to the application, an account password and a contact address, etc.

The user terminal can obtain the first identity information of the user and the new user information to be changed after a user information change operation is detected. Then, the user terminal can generate a user information change request carrying the first identity information and the new user information, and thereafter, the user terminal can send the user information change request to an application node corresponding to the application. The application node corresponding to the application is the responsive application node. The first identity information can be a user's name, an identity card number, an image containing the user's face features, and the like.

The responsive application node can obtain the first identity information and the new user information carried by the user information change request, and determine a plurality of verification application nodes among the plurality of application nodes included in the blockchain. Then the responsive application node may send the first identity information and the new user information to each of the identified verification application nodes.

Each verification application node can verify the received first identity information and new user information to obtain verification results. The verification application node can then send the validation result to the responsive application node. The specific verification process of verifying the first identity information and the new user information by the verification application node can refer to the processing process of verifying the first identity information and the new user information by the verification application node in the above-mentioned blockchain-based user information processing method, which will not be repeated here.

The responsive application node can receive the verification results sent by each verification application node, to obtain a plurality of verification results. If the responsive application node determines that both the first identity information and the new user information pass verification based on the received verification result, the responsive application node may change the user information of the user stored in the blockchain based on the new user information. If the responsive application node determines that the first identity information or the new user information fails to pass verification based on the received verification result, the responsive application node may send to the user terminal prompt information that verification failed.

In some embodiments, because it can be realized that changing a user's information in each application by changing the new user information in the blockchain only once. Therefore, it does not need to change a user's information in each application respectively, thereby solving the problem of inconvenience in changing the user information.

In some embodiments, the verification application node is configured for sending verification information to a user terminal corresponding to the mobile phone number when the new user information includes a mobile phone number, and receiving feedback information sent by the user terminal, where the feedback information is input by the user based on the verification information; and determining that the new user information passes verification when the feedback information matches the verification information; determining that the new user information fails to pass verification when the feedback information does not match the verification information.

The verification information may be a short message containing verification characters, and correspondingly, the feedback information may be verification characters. Alternatively, the verification information may be a short message containing a preset question, and correspondingly, the feedback information may be an answer to the preset question. A default question can be set and answered by the user while using the application.

In some embodiments, the verification application node may send verification information to the user terminal corresponding to the mobile phone number in the case that the new user information contains a mobile phone number.

The user terminal may output the verification information after receiving the verification information so that the user inputs feedback information based on the verification information. Then, the user terminal can obtain the feedback information input by the user and send the feedback information to the verification application node.

The verification application node can judge whether the feedback information matches the verification information after receiving the feedback information. If the feedback information matches the verification information, the verification application node can judge that the new user information passes the verification. If the feedback information does not match the verification information, the verification application node can judge that the new user information fails to pass verification.

In some embodiments, the user terminal corresponding to the mobile phone number may receive the verification information sent by the verification application node and send to the verification application node feedback information input by the user based on the verification information. The verification application node can judge whether the feedback information input by the user matches the verification information sent, so as to verify the new user information conveniently and effectively.

In some embodiments, the verification application node is configured for sending to the responsive application node a verification result generated by verifying the first identity information and the new user information; and The responsive application node is configured for receiving a verification result generated by each verification application node to obtain a plurality of verification results; and determining that the first identity information and the new user information pass verification when the plurality of verification results meet a preset consistency condition.

In some embodiments, each verification application node can verify the first identity information and the new user information to obtain a verification result. Then, each verification application node can send verification results to the responsive application node. The verification results can include the following four situations: 1) the first identity information passes verification, and the new user information fails to pass verification; 2) the first identity information fails to pass verification, and the new user information is passes verification; 3) both the first identity information and the new user information pass verification; 4) both the first identity information and the new user information fails to pass verification. When the verification result is case 3), it indicates that the verification has been passed.

The responsive application node can receive the verification results sent by each verification application node, to obtain a plurality of verification results. Then, the responsive application node can judge whether the plurality of verification results meet the preset consistency condition. The preset consistency condition may be that a plurality of verification results pass verification. The preset consistency condition may also be that the number of results which pass verification in the plurality of verification results is greater than half of the total number of verification results.

The responsive application node can determine that the first identity information and the new user information pass verification when the plurality of verification results meet the preset consistency condition, and determine that the first identity information and the new user information fails to pass verification when the plurality of verification results do not meet the preset consistency condition.

In some embodiments, the first identity information and the new user information are verified by a plurality of verification application nodes. Then, the responsive application node determines that the first identity information and the new user information pass verification only when the verification results of the plurality of verification application nodes meet a preset consistency condition. Therefore, it is possible to improve the validity and credibility of verifying the first identity information and the new user information.

In some embodiments, the responsive application node is also used for receiving a user registration request sent by the user terminal, wherein the user registration request carries a third identity information and the user information of the user, and is used for sending the third identity information to an identity information verification node in the blockchain;

The identity information verification node is used for verifying the third identity information and sending a verification result to the responsive application node, wherein the verification result is verification passed or verification failed;

The responsive application node is also used for storing the third identity information and the user information into the blockchain when the verification result received is verification passed.

In some embodiments, when a user wants to register a certain application, the user can perform a preset registration operation to the user terminal. The preset registration operation can be clicking on a preset submission icon after filling in the third identity information and user information of the user on the preset registration page of the application. The preset registration operation may also be entering a command code indicating submission after filling in the third identity information and user information of the user on the preset registration page of the application.

The user terminal can generate a user registration request carrying the third identity information and the user information in response to a preset registration operation, and then the user terminal can send the user registration request to an application node corresponding to the application. The application node corresponding to the application is the responsive application node.

In response to the application node, the third identity information can be sent to the identity information verification node in the blockchain after receiving the user registration request.

Each identity information verification node can verify the third identity information after receiving the third identity information to obtain the verification result of the third identity information, and the verification result is that the third identity information passes verification or the third identity information fails to pass verification. Then, the identity verification node can send the verification result to the responsive application node.

The responsive application node can receive the verification results sent by a plurality of identity information verification nodes and obtain a plurality of verification results. Then, the responsive application node can judge whether a plurality of verification results are all that the third identity information fails to pass verification. If a plurality of verification results are all that the third identity information passes verification, the responsive application node can store the third identity information and the user information into the blockchain. If the plurality of verification results contains a third identity information that fails to pass verification, the responsive application node may send to the user terminal prompt information that the identity information fails to pass verification.

In some embodiments, in response to a preset registration operation, the user terminal may send a user registration request to a responsive application node. Then, the responsive application node may send third identity information of a user to be registered to a plurality of identity information verification nodes. Thereafter, each identity information verification node can verify the third identity information and send the verification result to the responsive application node. The responsive application node can store the third identity information and the user information in the blockchain when a plurality of verification results all pass verification, thereby completing the user registration.

Therefore, by packaging and storing the third identity information and user information of the user into the blockchain, it can be realized that after registering a certain application contained in the blockchain, the user can log in to other applications contained in the blockchain by using the same user information, which is convenient for the user to register and use each application quickly. On the other hand, it is convenient to change user information subsequently based on blockchain.

In some embodiments, the user terminal is used for generating a user public key and a user private key, encrypting the user information and the third identity information by using the user private key, and sending the encrypted user information and the third identity information to the responsive application node;

The responsive application node is used for storing the encrypted user information and the third identity information into the blockchain.

In some embodiments, a user terminal may generate a user public key and a user private key in response to a preset registration operation. Then, the user terminal can encrypt the user information and the third identity information by using the user private key, and then the user terminal can send the encrypted user information and the third identity information to the responsive application node.

The responsive application node can store the encrypted responsive application node in the blockchain when the received verification results all pass verification.

In some embodiments, the user terminal can encrypt the user information and the third identity information by using the generated user public key and the user private key, and then send the encrypted user information and the third identity information to the responsive application node, so that the responsive application node stores the encrypted responsive application node in the blockchain. Therefore, the security of storing the user information and the third identity information can be improved, and the private information of the user can be protected.

Figure 5:
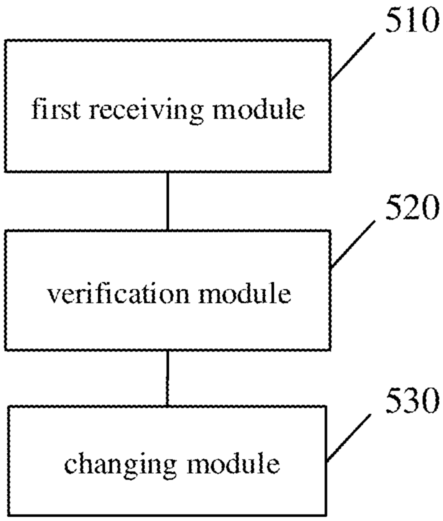
FIG. 5 illustrates a schematic structural diagram of a blockchain-based user information processing apparatus provided by an embodiment of the present disclosure.

Based on the same technical concept, the present disclosure also provides a blockchain-based user information processing apparatus. The apparatus is applied to any application node. The blockchain includes a plurality of application nodes. As shown in FIG. 5, the apparatus includes:

a first receiving module 510, configured for receiving a user information change request sent by a user terminal, wherein the user information change request carries first identity information of the user and new user information to be changed;

a verification module 520, configured for verifying the first identity information and the new user information through a plurality of verification application nodes in the blockchain respectively, the verification application nodes are application nodes in the blockchain; and a changing module 530, configured for changing user information of the user stored in the blockchain based on the new user information when the first identity information and the new user information pass verification.

In some embodiments, the verification module includes:

a sending sub-module, configured for sending the first identity information and the new user information to each verification application node in the blockchain;

an acquisition sub-module, configured for acquiring second identity information of the user stored in the blockchain through each of the verification application nodes; and a first verification sub-module, configured for verifying the new user information through the verification application node when the first identity information and the second identity information are the same.

In some embodiments, the first verification sub-module is used for, under the condition that the new user information includes the mobile phone number, sending verification information to the user terminal corresponding to the mobile phone number through the verification application node and receiving feedback information sent by the user terminal, wherein the feedback information is input by the user based on the verification information; it is determined that the new user information passes verification if the feedback information matches the verification information; it is determined that the new user information fails to pass verification if the feedback information does not match the verification information.

In some embodiments, the apparatus further includes:

an acquisition module, configured for acquiring the user information of the user stored in the blockchain through a plurality of verification application nodes respectively under the condition that the user information change request also carries original user information of the user;

the verification module is further configured for determining that the original user information passes verification when the original user information is the same as the user information; and the changing module is configured for changing the user information based on the new user information when the first identity information, the new user information and the original user information all pass verification.

In some embodiments, the verification module includes:

a second acquisition sub-module, configured for acquiring a verification result generated by each of the verification application nodes verifying the first identity information and the new user information to obtain a plurality of verification results; and a determination sub-module, configured for determining that the first identity information and the new user information pass verification when the plurality of verification results satisfy a preset consistency condition.

In some embodiments, the apparatus further includes:

a second receiving module, configured for receiving a user registration request sent by the user terminal, wherein the user registration request carries third identity information and user information of the user;

a sending module, configured for sending the third identity information to an identity information verification node in the blockchain so that the identity information verification node verifies the third identity information; and a storage module, configured for storing the third identity information and the user information into the blockchain when the third identity information passes verification by the identity information verification node.

In some embodiments, the present disclosure provides a blockchain-based user information processing apparatus, which can receive a user information change request sent by the user terminal, wherein the user information change request carries the first identity information of the user and the new user information to be changed; verify the first identity information and the new user information through a plurality of verification application nodes in the blockchain respectively, wherein the verification application nodes are application nodes in the blockchain; changing the user information of the user stored in the blockchain based on the new user information if the first identity information and the new user information pass verification.

Because it can be realized that updating a user's user information in each application by changing the new user information in the blockchain only once. Therefore, it does not need to change a user's information in each application respectively, thereby solving the problem of inconvenience in changing the user information.

Figure 6:
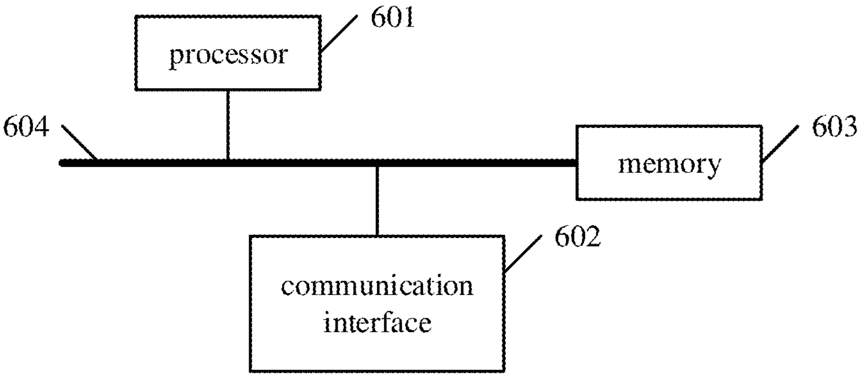
FIG. 6 illustrates a schematic structural diagram of an electronic device provided by an embodiment of the present disclosure.

Based on the same technical concept, the present disclosure also provides an electronic device, as shown in FIG. 6, which includes a processor 601, a communication interface 602, a memory 603 and a communication bus 604, wherein the processor 601, the communication interface 602 and the memory 603 communicate with each other through the communication bus 604, the memory 603 is configured for storing computer programs;

the processor 601 is configured to implement the blockchain-based user information processing method according to the present disclosure when executing a program stored in the memory 603.

In some embodiments, the communication bus referred to in the above electronic device may be a Peripheral Component Interconnect (PCI) bus, an Extended Industry Standard Architecture (EISA) bus, or the like. The communication bus can be divided into address bus, data bus, control bus and so on. For ease of presentation, only one thick line is used in the figures, but it does not mean that there is only one bus or one type of bus.

The communication interface is used for communication between the electronic device and other devices.

The memory may include a Random Access Memory (RAM) or a Non-Volatile Memory (NVM), for example, at least one disk memory. In some embodiments, the memory may also be at least one storage device located remotely from the processor.

In some embodiments, the processor may be a general purpose processor, including a Central Processing Unit (CPU), a Network Processor (NP), and the like; It can also be Digital Signal Processing (DSP), Application Specific Integrated Circuit (ASIC), Field-Programmable Gate Array (FPGA) or other programmable logic devices, discrete gates or transistor logic devices, and discrete hardware components.

The present disclosure also provides a computer readable storage medium in which a computer program is stored, and when the computer program is executed by the processor, the blockchain-based user information processing method of the present disclosure is realized.

The present disclosure also provides a computer program product including instructions that, when run on a computer, cause the computer to execute the blockchain-based user information processing method according to the present disclosure.

In some embodiments, it may be implemented in whole or in part by software hardware firmware or any combination thereof. When implemented in software, it can be implemented in whole or in part in the form of a computer program product. The computer program product includes one or more computer instructions. When the computer program instructions are loaded and executed on a computer, the processes or functions described in accordance with embodiments of the present disclosure are generated in whole or in part. The computer may be a general purpose computer, a special purpose computer, a computer network, or other programmable device. The computer instructions may be stored in a computer-readable storage medium, Or from one computer-readable storage medium to another, For example, the computer instructions may be transmitted from one Web site, computer, server, or data center to another Web site, computer, server, or data center via wired (e.g. coaxial cable, optical fiber, digital subscriber line (DSL)) or wireless (e.g. infrared, wireless, microwave, etc.). The computer-readable storage medium may be any usable medium accessible to a computer or a data storage device such as a server, data center, or the like that includes one or more usable media integration. The usable media may be magnetic media (e.g. floppy disk, hard disk, magnetic tape), optical media (e.g. DVD), or semiconductor media (e.g. Solid State Disk (SSD)), etc.

It should be noted that relational terms such as "first" and "second" are used herein only to distinguish one entity or operation from another, and do not necessarily require or imply any such actual relationship or order between these entities or operations. Moreover, the terms "including", "including" or any other variation thereof are intended to encompass non-exclusive inclusion, so that a process, method, article or equipment that includes a set of elements includes not only those elements but also other elements that are not explicitly listed or are inherent to such a process, method, article or equipment. In the absence of further limitations, an element defined by the phrase "includes an . . . " does not preclude the existence of another identical element in the process, method, article or equipment in which the element is included.

The foregoing is only a specific embodiment of the present disclosure to enable those skilled in the art to understand or implement the present disclosure. Various modifications to these embodiments will be apparent to those skilled in the art and the general principles defined herein may be implemented in other embodiments without departing from the spirit or scope of the present disclosure. Accordingly the present disclosure will not be limited to the embodiments shown herein but is intended to conform to the widest scope consistent with the principles and novel features disclosed herein.

The invention claimed is:

1. A blockchain-based user information processing method, wherein the method is applied to any application node in a blockchain, the blockchain comprises a plurality of application nodes, the method comprising:

receiving a user information change request sent by a user terminal, wherein the user information change request carries first identity information of a user and new user information to be changed;

verifying the first identity information and the new user information through a plurality of verification application nodes in the blockchain respectively, wherein the plurality of verification application nodes are application nodes in the blockchain, each of the plurality of verification application nodes independently generating a verification result; and changing user information of the user stored in the blockchain based on the new user information if the first identity information and the new user information pass verification.

2. The method according to claim 1, wherein verifying the first identity information and the new user information through a plurality of verification application nodes in the blockchain respectively comprises:

sending the first identity information and the new user information to each of the plurality of verification application nodes in the blockchain;

acquiring second identity information of the user stored in the blockchain through each of the plurality of verification application nodes; and verifying the new user information through each of the plurality of verification application nodes if the first identity information and the second identity information are the same.

3. The method according to claim 2, wherein the new user information comprises a mobile phone number, verifying the new user information through each of the plurality of verification application nodes comprises:

sending verification information to the user terminal corresponding to the mobile phone number through each of the plurality of verification application nodes and receiving feedback information sent by the user terminal, wherein the feedback information is input by the user based on the verification information;

determining that the new user information pass verification if the feedback information matches the verification information;

determining that the new user information fails to pass verification if the feedback information does not match the verification information.

4. The method according to claim 1, wherein the user information change request also carries original user information of the user, the method further comprises:

acquiring the user information of the user stored in the blockchain through the plurality of verification application nodes respectively;

determining that the original user information passes verification if the original user information is the same as the user information; and changing the user information of the user stored in the blockchain based on the new user information if the first identity information and the new user information pass verification comprises:

changing the user information based on the new user information if the first identity information, wherein the new user information and the original user information all pass verification.

5. The method according to claim 1, wherein the first identity information and the new user information pass verification in a manner comprising:

acquiring a verification result generated by each of the plurality of verification application nodes verifying the first identity information and the new user information to obtain a plurality of verification results; and determining that the first identity information and the new user information pass verification if the plurality of verification results satisfy a preset consistency condition.

6. The method according to claim 1, wherein the method further comprises:

receiving a user registration request sent by the user terminal, wherein the user registration request carries third identity information and user information of the user;

sending the third identity information to an identity information verification node in the blockchain so that the identity information verification node verifies the third identity information; and storing the third identity information and the user information into the blockchain if the identity information verification node verifies that the third identity information passes verification.

7. A blockchain-based user information processing system, wherein the system comprises a plurality of application nodes, each of the plurality of application nodes comprises at least one processor and a memory storing a local copy of a distributed ledger, and a communication interface for exchanging data with other application nodes of the plurality of application nodes, wherein, a responsive application node among the plurality of application nodes, configured for receiving a user information change request sent by a user terminal, sending first identity information and new user information to be changed to a plurality of verification application nodes in the plurality of application nodes, the first identity information and the new user information are carried by the user information change request;

each of the plurality of verification application nodes, configured for verifying the first identity information and the new user information and independently generating a verification result; and the responsive application node, further configured for changing the user information of a user stored in a blockchain based on the new user information when the first identity information and the new user information pass verification.

8. The system according to claim 7, wherein each of the plurality of verification application nodes is configured for sending verification information to a user terminal corresponding to a mobile phone number when the new user information comprises the mobile phone number, and receiving feedback information sent by the user terminal, the feedback information is input by the user based on the verification information; and determining that the new user information passes verification when the feedback information matches the verification information; determining that the new user information fails to pass verification when the feedback information does not match the verification information.

9. The system according to claim 7, wherein each of the plurality of verification application nodes is configured for sending to the responsive application node a verification result generated by verifying the first identity information and the new user information; and the responsive application node is configured for receiving a verification result generated by each of the plurality of verification application nodes to obtain a plurality of verification results; and determining that the first identity information and the new user information pass verification when the plurality of verification results meet a preset consistency condition.

10. The system according to claim 7, wherein the responsive application node is further configured for receiving a user registration request sent by the user terminal, wherein the user registration request carries a third identity information and the user information of the user, and is used for sending the third identity information to an identity information verification node in the blockchain;

the identity information verification node is configured for verifying the third identity information and sending a verification result to the responsive application node, wherein the verification result is verification passed or verification failed;

the responsive application node is further configured for storing the third identity information and the user information into the blockchain when the verification result received is verification passed.

11. The system according to claim 10, wherein the user terminal is configured for generating a user public key and a user private key, and encrypting the user information and the third identity information by using the user private key, and sending the encrypted user information and the third identity information to the responsive application node; and the responsive application node is configured for storing the encrypted user information and the third identity information into the blockchain.

12. A blockchain-based user information processing apparatus, wherein the apparatus is applied to any application node in a blockchain, the blockchain comprises a plurality of application nodes, the apparatus comprising:

a first receiving module, configured for receiving a user information change request sent by a user terminal, wherein the user information change request carries first identity information of the user and new user information to be changed;

a verification module, configured for verifying the first identity information and the new user information through a plurality of verification application nodes in the blockchain respectively, the plurality of verification application nodes are application nodes in the blockchain, each of the plurality of verification application nodes independently generating a verification result; and a changing module, configured for changing user information of the user stored in the blockchain based on the new user information when the first identity information and the new user information pass verification.

13. The apparatus according to claim 12, wherein the verification module comprises:

a sending sub-module, configured for sending the first identity information and the new user information to each of the plurality of verification application nodes in the blockchain;

an acquisition sub-module, configured for acquiring second identity information of the user stored in the blockchain through each of the plurality of verification application nodes; and a first verification sub-module, configured for verifying the new user information through each of the plurality of verification application nodes when the first identity information and the second identity information are the same.

14. An electronic device, comprising: a processor, a communication interface, a memory and a communication bus, wherein the processor, the communication interface and the memory communicate with each other through the communication bus;

the memory is configured for storing computer programs;

the processor is configured to implement the method according to claim 1, when executing a program stored in the memory.

15. A non-transitory computer-readable storage medium, wherein a program is stored on the non-transitory computer-readable storage medium, the program, when executed by the processor, implements the method according to claim 1.

* * * * *